United States Patent [19]

Huntley et al.

[11] Patent Number: 4,983,983
[45] Date of Patent: Jan. 8, 1991

[54] SEMI-AUTOMATIC DIRECTION FINDING SET

[75] Inventors: William P. Huntley, Old Lyme; David J. Swanick, Salem, both of Conn.

[73] Assignee: The United States of America as represented by the Secretary of the Navy, Washington, D.C.

[21] Appl. No.: 446,262

[22] Filed: Dec. 5, 1989

[51] Int. Cl.$^5$ .............................. G01S 3/14; G01S 7/06
[52] U.S. Cl. ....................................... 342/443; 342/430
[58] Field of Search ................ 342/417, 443, 430, 429, 342/932, 445, 447, 449

[56] References Cited

U.S. PATENT DOCUMENTS 3,440,656  4/1969  Wong et al. ......................... 342/417
3,747,107  7/1973  Poppe et al. ......................... 342/417

Primary Examiner—Gilberto Barrón, Jr.
Attorney, Agent, or Firm—Michael J. McGowan; Prithvi C. Lall

[57] ABSTRACT

A receiver selects and amplitude demodulates an RF signal from one of a plurality of directional antennas. The demodulated signal is then delayed to put it in time synchronism with the same signal information from an omnidirectional antenna. A signal is then generated of the peak pulses of the demodulated signal when the pulses are in time synchronism with pulses from the omnidirectional antenna. A control indicator receives the peak pulses along with periscope bearing signals and ship's heading signals and gives an r,Θ display of the amplitude of the RF signal selected from the directional antenna at the periscope true bearing angle.

4 Claims, 2 Drawing Sheets

----- EXISTING EQUIPMENT INTERFACE
——— SADF EQUIPMENT

SEMI-AUTOMATIC DIRECTION FINDING SET

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a passive radar early warning system. More particularly the system eliminates spurious received signals and determines the true bearing of a detected signal.

(2) Description of the Prior Art

There are several type prior art passive early warning receivers. These systems utilize only directional antennas. They do not utilize the benefits that can be derived by combining the use of both omnidirectional and directional antennas. In addition most of passive prior art devices do not attempt to accurately determine direction. The ones that do attempt to determine direction have functional problems. One such prior art system uses only periscope bearing to determine the angle of arrival. If the ship is turning while a person is slowly rotating the periscope antennas, confusion can result. Another difficulty is that of finding the direction of a radar signal in a multisignal environment because one has to remember the particular signal that is of interest. Other disadvantages of prior art systems are low sensitivity due to absence of RF preamplifiers and difficulty in the determination of the highest signal level when listening because the acoustic response of the ear is not linear.

SUMMARY OF THE INVENTION

Accordingly, it is a general purpose and object of the present invention to provide an improved passive radar detection system that obviates the difficulties of the prior art devices. It is a further object to provide a system in which the capabilities of both omnidirectional and directional antennas are combined so that optimum detection and direction finding results. These objects are accomplished with the present invention by providing a system in which a signal received from an omnidirectional antenna is processed with a received signal from one of a plurality of directional antennas. The system also processes ship's heading and periscope bearing signals. The system then displays an r,Θ plot of the amplitude and true bearing of the received signal from the directional antenna.

DESCRIPTION OF THE PREFERRED EMBODIMENT

Figure 1:
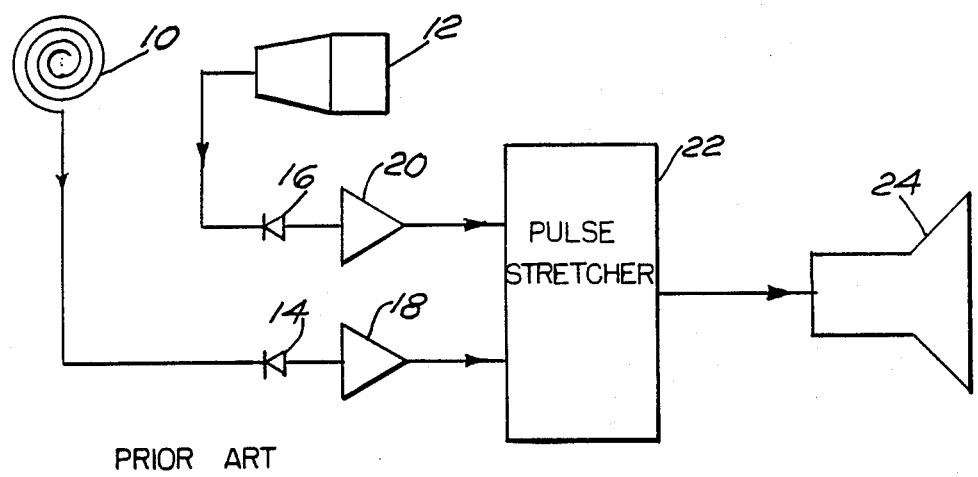
FIG. 1 is a block diagram of a prior art semi-automatic direction finding set

Referring now to FIG. 1 there is shown a prior art system. A spiral antenna 10 and a horn antenna 12 are both periscope directional antennas. Different type antennas are selected to give a wider frequency band. The spiral antenna 10 operates at a lower frequency than the horn antenna 12. The radar signals received by each directional antenna are transmitted to respective RF detectors 14 and 16. RF detectors 14 and 16 amplitude demodulate the RF bursts within the radar signals. The signals from each of the RF detectors 14 and 16 are then fed to respective video amplifiers 18 and 20 for amplification purposes. The signals from each of the video amplifiers 18 and 20 is then sent to a pulse stretcher 22 which combines the received signals and increases the pulse widths of the signals and thereby the energy content within the audible range of the received signals. The output signal of pulse stretcher 22 is then sent to a loudspeaker 24 which produces an audible signal.

The antennas 10 and 12 both point in the same direction and rotate in unison. The receipt of the highest signal level indicates the direction of the signal. In the prior art system of FIG. 1 it would be determined by the loudest noise.

Figure 2:
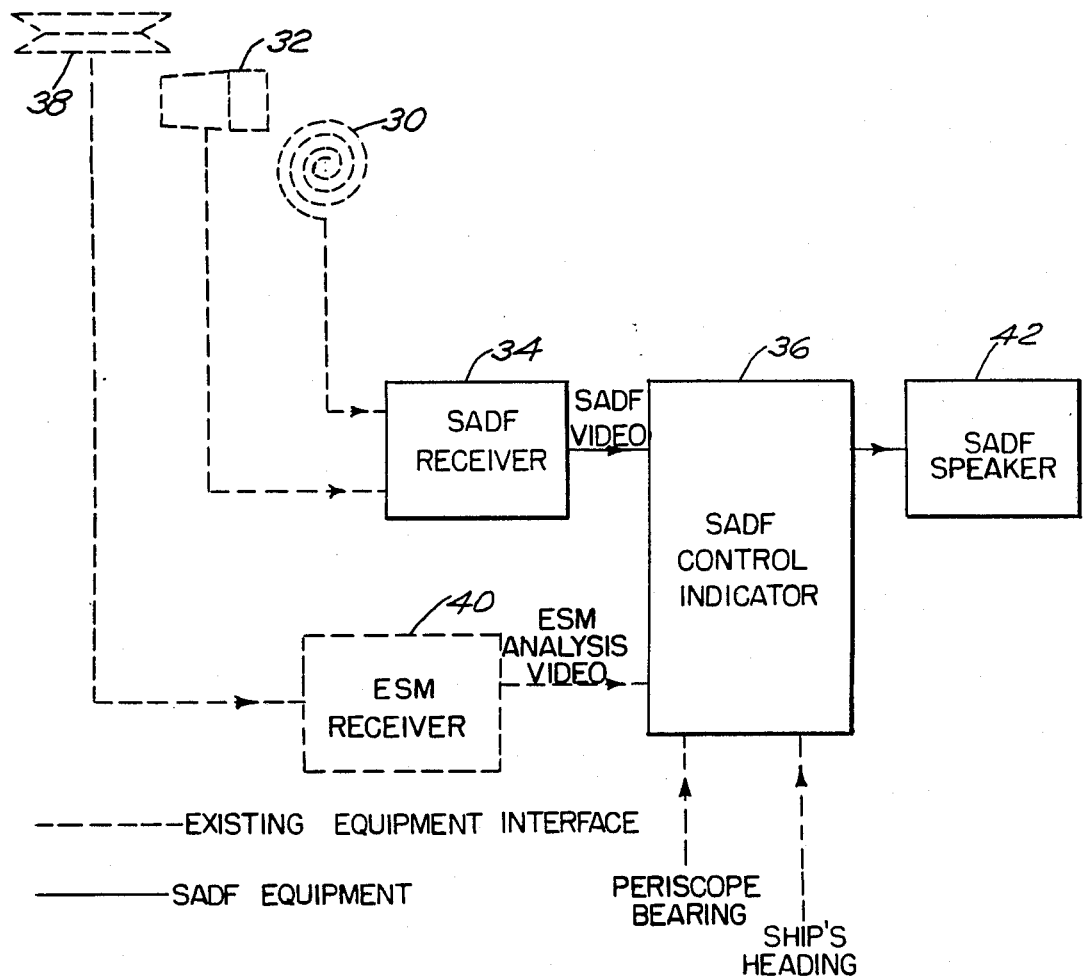
FIG. 2 is a block diagram of a semi-automatic direction finding set in accordance with the present invention.
Figure 3:
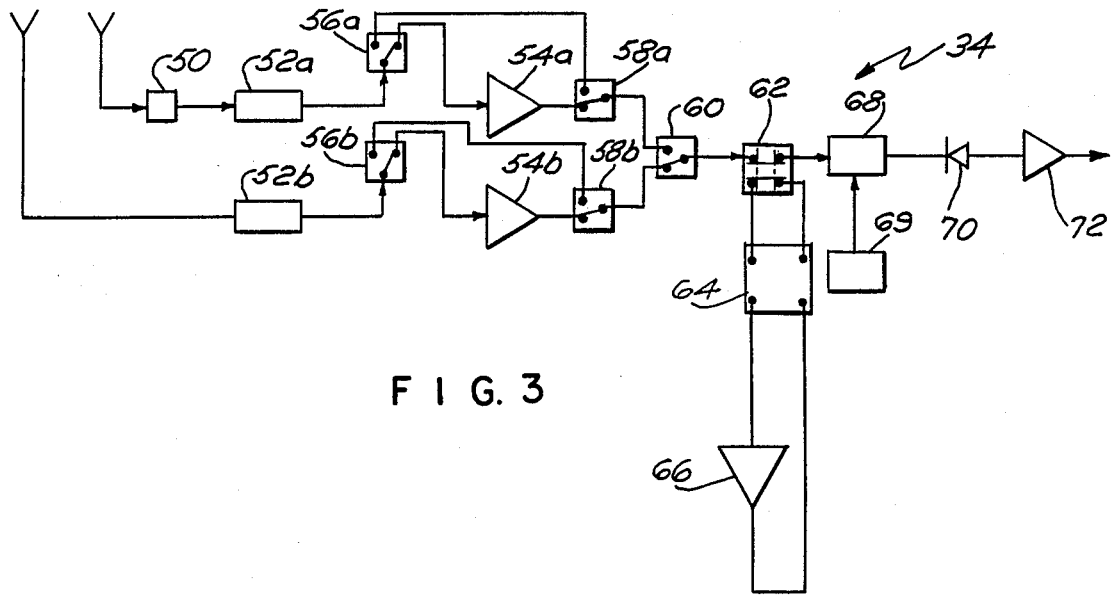
FIG. 3 is a block diagram of the semi-automatic direction finding set receiver of FIG. 2.
Figure 4:
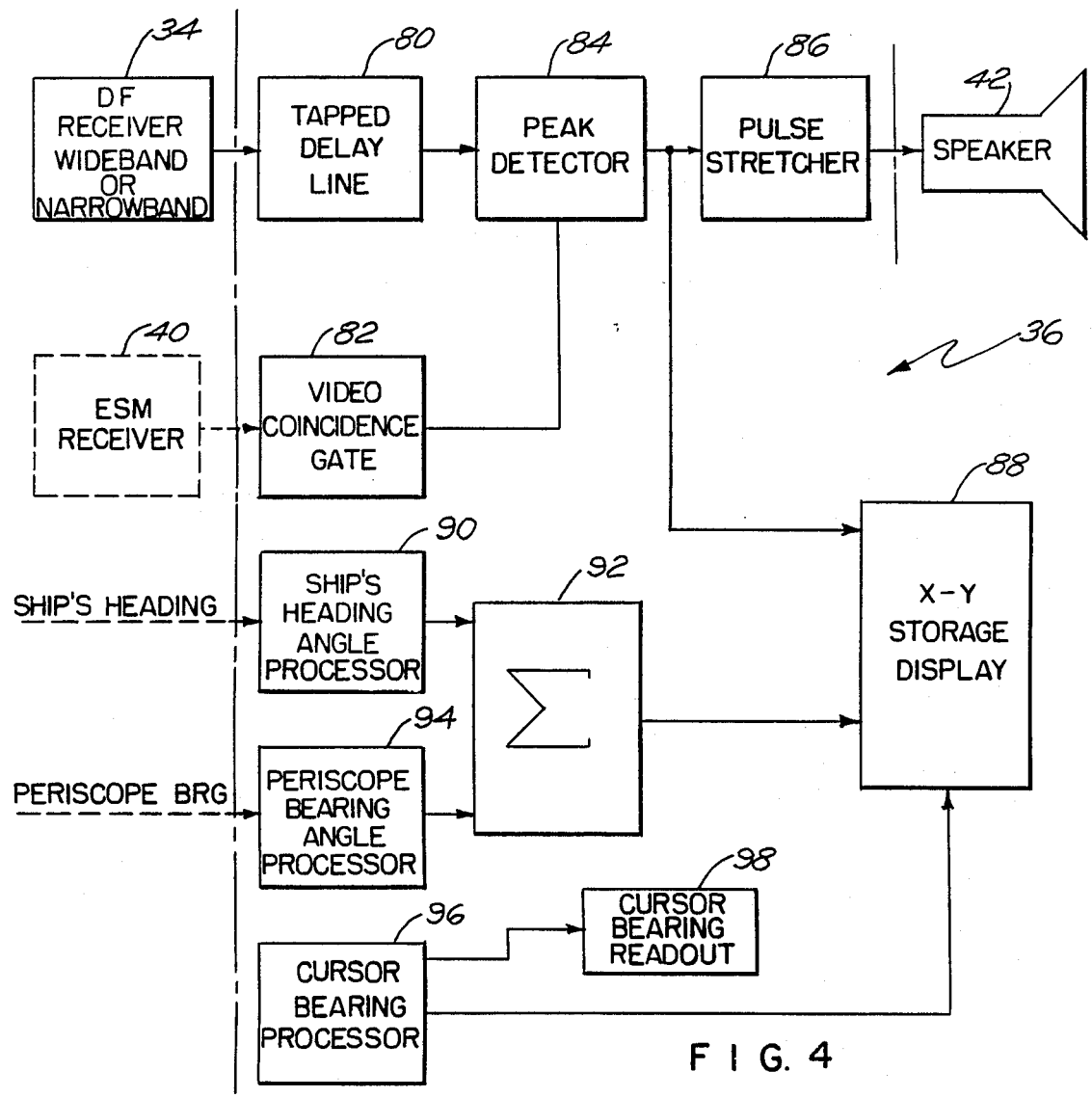
FIG. 4 comprises a block diagram of the semi-automatic direction finding set control indicator of FIG. 2 with connecting components.

FIGS. 2, 3 and 4 show the present invention. In the following description, components shown with dashed lines are existing equipment interfaces and form no part of the present invention. Components forming part of the inventive semiautomatic direction finding system are shown with solid lines.

Refer now to FIG. 2 for an overall block diagram of the system. Directional spiral antenna 30 and directional horn antenna 32 are identical to respective directional antennas 10 and 12 of FIG. 1. Both antennas 30 and 32 are passive, face in the same direction, and rotate in unison.

The two directional antennas 30 and 32 receive RF radar signals and are both connected to the same semi-automatic direction finding receiver 34 for transmission of the received signal. The receiver 34 combines and amplifies the RF signals received from antennas 30 and 32. In addition the receiver 34 AM demodulates the RF bursts. The signal from receiver 34 is then supplied to semi-automatic direction finding control indicator 36 for further processing.

The operation of receiver 34 and control indicator 36 will be described in greater detail later on with reference to respective FIGS. 3 and 4.

In addition to the RF signals from directional antennas 30 and 32 an omnidirectional antenna 38 supplies an RF signal to electronic support measures (ESM) receiver 40. ESM receiver 40 tunes to specific narrow frequency bands selected and produces video signals. These video signals are then supplied to control indicator 36. The combination of the omnidirectional antenna 38 and the ESM receiver 40 for tuning to specific narrow frequency bands selected and producing video signals is well known in the art and standard equipment aboard naval vessels.

Control indicator 36 in addition to the above-described signals received from semi-automatic direction finding receiver 34 and ESM receiver 40 also receives a periscope bearing signal and a ship's heading signal from standard equipment. The control indicator 36 processes these four input signals and provides within the control indicator 36 a visual display indicating the amplitude vs. azimuth angle of the signal received by either of the direction finding antennas 30 or 32. In addition the video signal is pulse stretched and sent to a loudspeaker 42 that sounds an audible signal representative of the received signal pulse repetition frequency and scan.

Refer now to FIG. 3 for a more detailed description of semi-automatic direction finding set receiver 34. The RF signal from directional spiral antenna 30 of FIG. 2 is applied to high pass filter 50 which removes any low frequency signals that will degrade the receiver's 34 performance. The output of high pass filter 50 is supplied to RF limiter 52a which protects the input stage of RF amplifier 54a in the case of high level signals. The output of RF limiter 52a is applied to the common of the lowband bypass relay 56a. Bypass relay 56a bypasses RF Amplifier 54a when the RF inputs are very strong thereby exceeding a predetermined value wherein the amplification from RF amplifier 54a is not needed. On the other hand the normally closed position of bypass relay 56a is connected to RF amplifier 54a where the input signal is amplified. The signal whether from RF amplifier 54a or directly from lowband relay 56a is transmitted through lowband bypass relay 58a. The signal from relay 58a is applied to a first input of band select switch 60.

The RF input from directional horn antenna 32 of FIG. 2 is transmitted through the circuitry of RF limiter 52b, RF amplifier 54b, and midband bypass relays 56b and 58b. These components operate similar to their counterparts 52a, 54a, 56a, and 58a. Components 56b and 58b differ from 56a and 58a in that 56b and 58b are midband bypass relays and 56a and 58a are lowband bypass relays.

Band select switch 60 is operated manually and selects the input originating at either spiral antenna 30 or horn antenna 32. The selected signal is supplied to a wideband/narrow band transfer switch 62 which is manually operated.

If the wideband/narrow band transfer switch 62 selects narrow band then the narrow band path provides improved sensitivity by reduction of the RF bandwidth and hence less noise. Additionally, it provides frequency selectivity for signal discrimination.

If the wideband/narrow band transfer switch 62 selects narrow band then the RF path passes through the Yttrium Iron Garnet (YIG) filter 64. The YIG filter 64 is a tunable narrow band RF filter. The signal from YIG filter 64 is applied to RF amplifier 66. The signal from amplifier 66 passes back through YIG filter 64 which further reduces the passband. The signal is then applied to an input terminal of wideband/narrow band transfer switch 62 which will pass the signal to the output terminal.

If instead the wideband is selected, the signal is conducted straight through wideband/narrow band transfer switch 62 directly.

In both cases the output from wideband/narrowband transfer switch 62 is applied to PIN switch 68 which functions as an adjustable attenuator by means of manually controlled PIN switch driver 69. The output signal of PIN switch 68 is applied to a Schottky RF detector 70 for AM demodulating the signal and then supplying the demodulated signal to video amplifier 72. The output of video amplifier 72 is the output of the semi-automatic direction finding set receiver 34 and is applied to semi-automatic direction finding set control indicator 36 as shown in FIG. 2.

Refer now to FIG. 4 for a further description of the semi-automatic direction finding set control indicator 36. The video signal from the receiver 34 is applied to a tapped delay line 80 within control indicator 36. The tapped delay line 80 will delay the video signal from receiver 34 to get the signal in time synchronism with the video signal from ESM receiver 40 which arrives at a later time than the video signal from receiver 34. The video signal from ESM receiver 40 is applied to video coincidence gate 82 which generates a digital signal for each pulse received. The digital signal is applied to peak detector 84 along with the output of delay line 80. Peak detector 84 processes the video signal from tapped delay line 80 if and only if its pulses are time coincident with the digital signal pulses from gate 82. This processing stores only the peak values of the received pulses from tapped delay line 80. This storing reduces amplitude perturbations on the signal. Peak detector 84 then supplies a pulse output signal indicative of the peak of the pulse amplitude received from delay line 80 and supplies this pulse output signal to pulse stretcher 86. The signal from pulse stretcher 86 is an output signal of control indicator 36 and is applied to the speaker 42. The signal from peak detector 84 is also supplied to a X-Y storage display 88 within control indicator 36.

A ship's heading synchro angle information signal is received and is applied to a ship's heading angle processor 90. The ship's heading synchro angle information signal is readily available from standard equipment aboard naval vessels. The ship's heading angle processor digitizes the incoming signal. The digital signal is then applied to summation circuit 92.

A periscope bearing synchro information signal is applied to a periscope bearing angle processor where the signal is digitized. The periscope bearing synchro information signal is readily available from standard equipment aboard naval vessels. The digital signal is then applied to summation circuit 92.

The digital summation circuit 92 then generates periscope angle information signals relative to true North. The signal from summation circuit 92 provides the azimuth angle input to X-Y storage display 88.

The X-Y storage display 88 is a CRT storage display that displays the amplitude of the signal from peak detector 84 as a function of the true periscope azimuth bearing. The X-Y storage display is an r,Θ display with the r indicating the amplitude of the signal and Θ the angle representing the periscope true bearing.

The cursor bearing processor 96 allows manual positioning of a cursor at the maximum r in the direction Θ of the display. At the same time the cursor bearing processor provides a cursor bearing readout 98 indicative of the cursor position which is adjusted to the maximum amplitude on the true bearing display.

There has therefore been described an improved radar direction finder. It fully utilizes equipment already in place aboard naval vessels such as directional and omnidirectional antennas, an ESM receiver, ship's heading and periscope bearing equipment. It utilizes signals from these signals to supply direction and magnitude information on incoming radar signals.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A semi-automatic direction finding set comprising:
receiving means having a plurality of inputs for receiving directional RF signals from a corresponding plurality of directional RF antennas, one RF signal directed to one each of said plurality of inputs, said receiving means further comprising selecting means for selecting one of said plurality of directional RF antenna signals and amplitude demodulation means for amplitude demodulating said selected directional RF input signal; and control indicating means having a first input means connected to said receiving means for receiving said selected amplitude demodulated directional RF input signal, said control indicating means further comprising a second input means for receiving an omnidirectional RF signal from an omnidirectional antenna, said control indicating means further comprising third and fourth input means for respectively receiving periscope bearing signals and ship's heading signals said control indicating means for processing and displaying the amplitude and direction of the selected directional RF signal as a function of periscope rotation in bearing relative to true north.

2. A semi-automatic direction finding set according to claim 1 wherein said receiving means further comprises:
a wideband/narrow band transfer switch connected to said selecting means for receiving the selected directional RF signal, said transfer switch being a two position switch with the entire band of directional RF signal being passed to an output terminal when said wideband/narrow band transfer switch is one position; and narrow band selecting means connected to said wideband/narrow band transfer switch for passing a narrow band of the selected directional RF signal to said wideband/narrow band transfer switch when said wideband/narrow band transfer switch is in the other position.

3. A semi-automatic direction finding set according to claim 2 wherein said control indicating means further comprises:
detecting and generating means connected to said first and second input means for supplying pulse output signals if the received pulses at the first input means are time coincident with the received pulses at the second input means;

summing means connected to said third and fourth input means for generating periscope angle information signals relative to true North; and storage display means connected for receiving signals from said detecting and generating means and said summing means for displaying an r,Θ display, with the r indicating the amplitude and Θ indicating the periscope angle relative to true North, of the selected one of said plurality of directional RF signals.

4. A semi-automatic direction finding set according to claim 3 wherein said detecting and generating means further comprises:
a tapped delay line connected to said first input means, said tapped delay line delaying the received amplitude demodulated RF input signals;

a video coincidence gate connected to said second input means, said video coincidence gate generating a digital signal for each pulse of the omnidirectional RF signals received; and a peak detector connected to said tapped delay line and said video coincidence gate for generating the peak values of the received amplitude demodulated RF input signals when they are time coincident with the video coincidence gate generated digital signal.

* * * * *